US012463381B2

(12) United States Patent
Houser et al.

(10) Patent No.: US 12,463,381 B2
(45) Date of Patent: Nov. 4, 2025

(54) HINGED CONNECTOR

(71) Applicant: TE Connectivity Solutions GmbH, Schaffhausen (CH)

(72) Inventors: Matthew Steven Houser, Middletown, PA (US); Brooke Glassman, Winston Salem, NC (US); John Wesley Hall, Middletown, PA (US); Galen Martin, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 356 days.

(21) Appl. No.: 18/160,343

(22) Filed: Jan. 27, 2023

(65) Prior Publication Data

US 2024/0258747 A1 Aug. 1, 2024

(51) Int. Cl.

| | |
|---|---|
| ***H01R 13/641*** | (2006.01) |
| ***H01R 13/50*** | (2006.01) |
| ***H01R 13/627*** | (2006.01) |
| ***H01R 13/639*** | (2006.01) |

(52) U.S. Cl.

CPC ......... *H01R 13/641* (2013.01); *H01R 13/501* (2013.01); *H01R 13/6271* (2013.01); *H01R 13/639* (2013.01)

(58) Field of Classification Search

None

See application file for complete search history.

(56) References Cited

U.S. PATENT DOCUMENTS

| | | | | |
|---|---|---|---|---|
| 7,297,032 | B2 * | 11/2007 | Kobayashi ........... | H01R 13/506 439/701 |
| 9,022,813 | B2 * | 5/2015 | Wilkner ............... | H01R 13/514 439/701 |
| 10,014,618 | B2 | 7/2018 | Upson et al. | |
| 10,770,824 | B2 | 9/2020 | Upson et al. | |

* cited by examiner

*Primary Examiner* — Tho D Ta

(57) ABSTRACT

A connector or connector assembly includes a first body hingedly connected to a second body and movable between a first and second position with respect thereto. The first body includes a first terminal position assurance (TPA) device, a first terminal space receiving a first terminal, and a first terminal latch engaging with the first terminal and securing it within the first terminal space. The second body includes a second TPA device, a second terminal space receiving a second terminal, and a second terminal latch engaging with the second terminal and securing it within the second terminal space. A TPA latch secures the first body and the second body in each of the first and second positions. In the second position, the first TPA device engages with the second terminal, and the second TPA device engages with the first terminal.

18 Claims, 6 Drawing Sheets

HINGED CONNECTOR

FIELD OF THE INVENTION

The present invention relates to connectors, and more particularly, to an electrical connector including a terminal position assurance device or element.

BACKGROUND

Electrical connector systems often suffer from assembly errors. These errors include, for example, the incorrect or insufficient insertion of the conductive terminals of the connector within a corresponding housing. As a result, electrical connectors often implement a terminal position assurance (TPA) device or component, which ensures that a partially seated terminal is detected during assembly or mating of the connector system. In this way, an operator may identify and remedy a terminal placement issue during the connector assembly or connector mating processes, avoiding connector damage and/or a failed or unreliable connections.

Existing TPA devices generally engage via a linear sliding motion between components. However, these and other existing TPA devices do not sufficiently address excessive play between the terminal and its housing, nor are they conducive for use with small connectors.

Accordingly, there is a need for improved TPA systems and associated connectors.

SUMMARY

In one embodiment of the present disclosure, a connector or connector assembly comprises a first body hingedly connected to a second body and movable relative thereto between a first and a second position. The first body includes a first terminal position assurance (TPA) device, a first terminal space receiving a first terminal, and a first terminal latch engaging with the terminal and securing it within the first terminal space. The second body includes a second TPA device, a second terminal space receiving a second terminal, a second terminal latch engaging with the second terminal and securing it within the second terminal space. A TPA latch secures the first body and the second body in each of the first and second positions. In the second position, the first TPA device engages with the second terminal, and the second TPA device engages with the first terminal.

BRIEF DESCRIPTION OF THE DRAWINGS

The invention will now be described by way of example with reference to the accompanying Figures, of which.

DETAILED DESCRIPTION OF THE EMBODIMENTS

Figure 1:
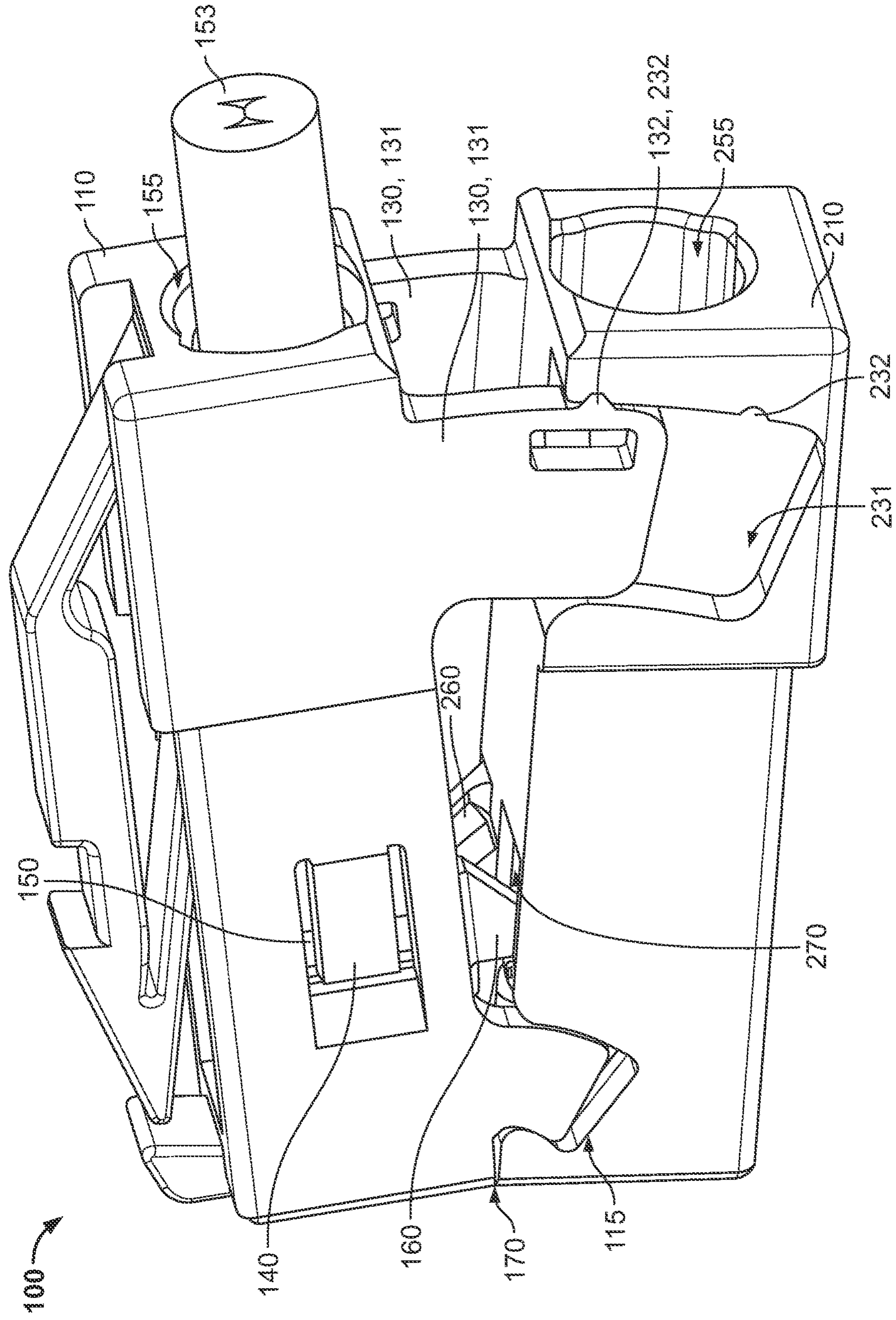
FIG. 1 is a perspective view of a connector according to an embodiment of the present disclosure in a first position.

Exemplary embodiments of the present disclosure will be described hereinafter in detail with reference to the attached drawings, wherein the like reference numerals refer to the like elements. The present disclosure may however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the present disclosure include a novel connector or plug design that implements a hinging or pivoting action in order to close its terminal position assurance (TPA) features and reduce the amount of terminal-to-housing play. According to embodiments, connector halves are selectively separated and brought together or closed via a hinge feature at the front of the connector. Each connector half has a TPA element that engage the terminals on the other half of the plug. This arrangement takes advantage of the arcuate motion of the TPA elements such that they urge the terminals toward hard stops at the front of the plug housings. By biasing the terminals toward the front of the plug, reductions in terminal play and terminal wipe are improved, maximizing connector performance. Additionally, embodiments of the present disclosure can be manufactured with greater ease, and used with connectors of smaller pitches.

Figure 2:
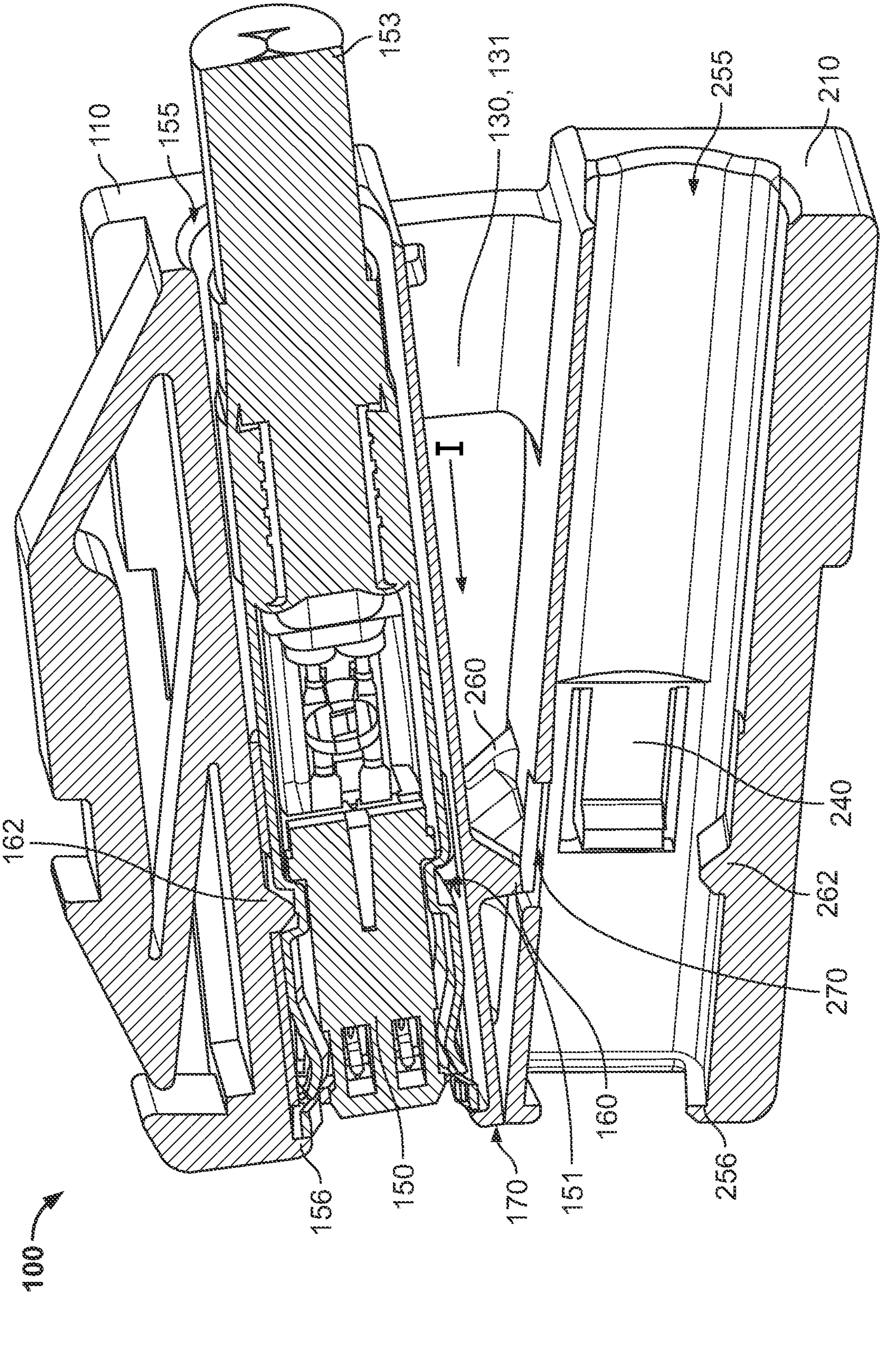
FIG. 2 is a cross-sectional perspective view of the connector of FIG. 1 in the first position with a first terminal installed therein.

Referring to FIGS. 1 and 2, embodiments of the present disclosure include improved connectors (e.g., electrical connectors), and more specifically, those utilizing terminal position assurance (TPA) features or devices. According to a first embodiment, a connector or plug 100 includes a first body 110 and a second body 210, also referred to herein as plug halves. In the exemplary embodiment, the first body 110 is shown with a first cable 153 extending therein to be connected to a first terminal, as shown in FIG. 2.

Figure 3A:
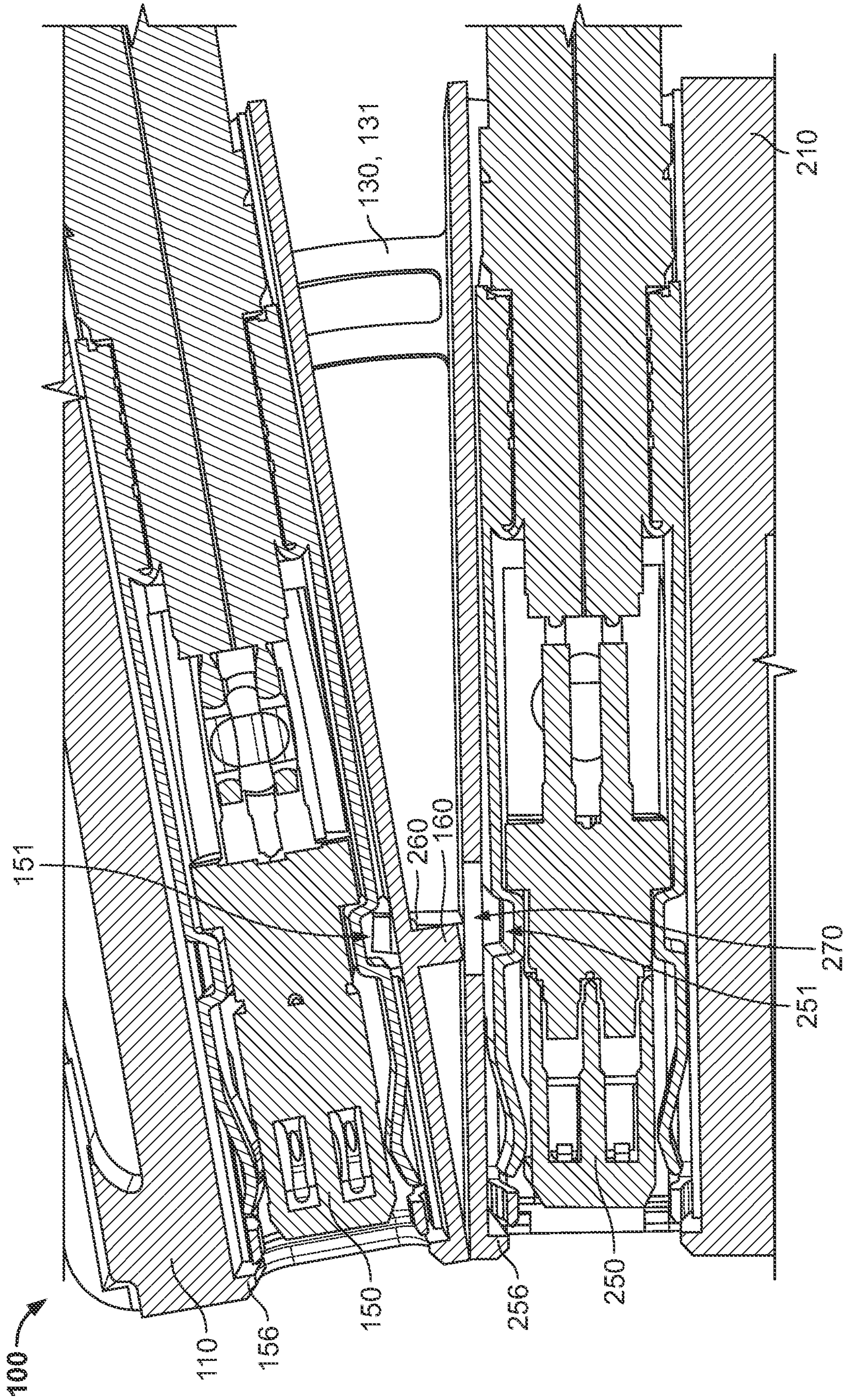
FIG. 3A is a side cross-sectional view of the connector of FIGS. 1 and 2 in the first position with a second terminal installed therein.
Figure 3B:
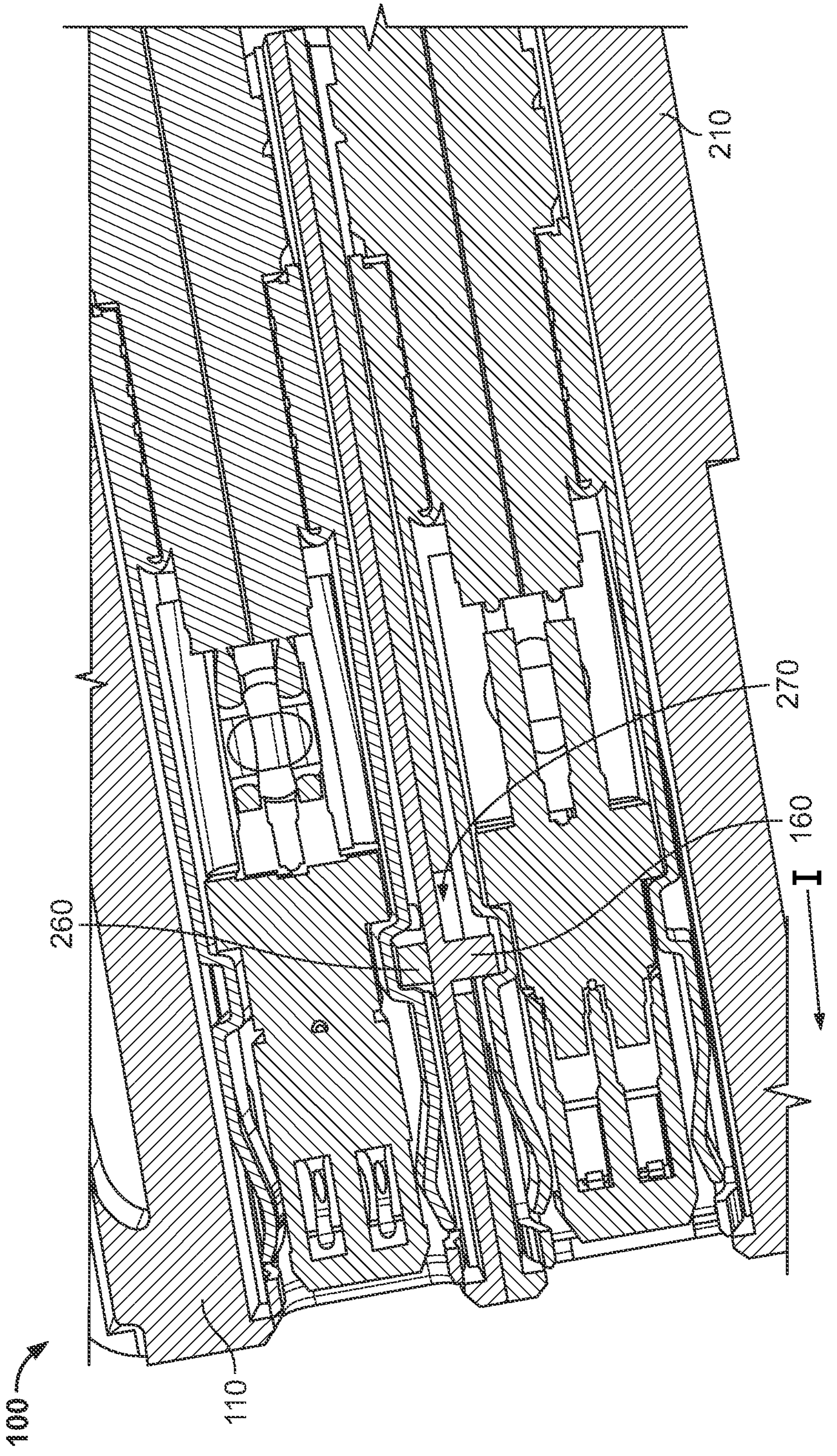
FIG. 3B is a side cross-sectional view of the connector of FIG. 3A in a second position.
Figure 4:
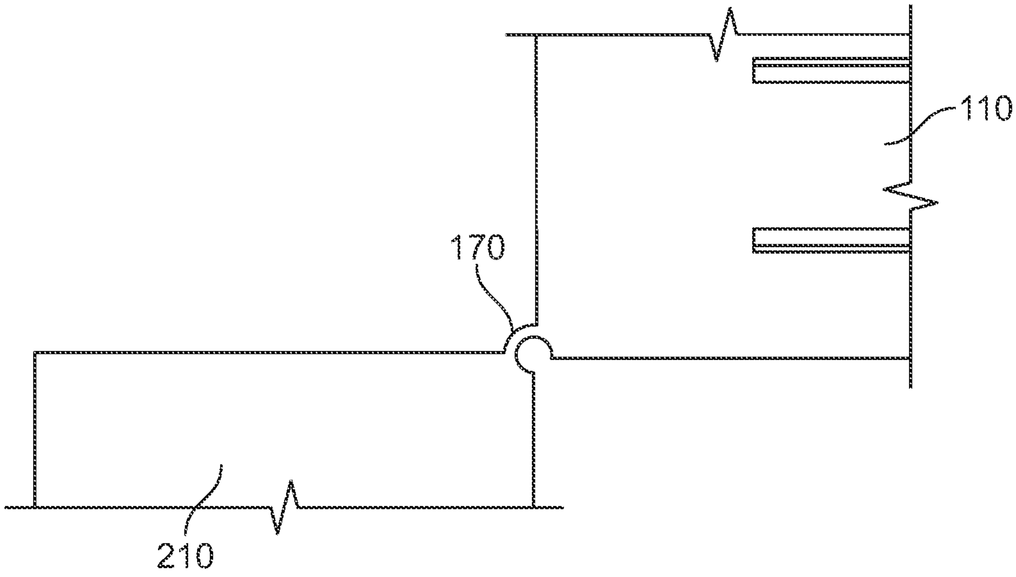
FIG. 4 is a side view of the connector of the preceding figures including a living hinge.

The first body 110 and the second body 210 are hingedly or otherwise rotatable connected together (e.g., via a one-piece living hinge 170, see FIG. 4). In the exemplary embodiment, a first position is shown in which the first body 110 and the second body 210 are in an at least partially separated state. The first position may be dictated by a TPA latch 130. Specifically, the TPA latch 130 includes a protrusion 132 formed on a latch arm 131 of the first body 110. The second body 210 defines a channel 231 which receives the latch arm 131 of the first body 110. The protrusion 132 of the latch arm 131 engages with corresponding recesses 232 formed within the channel 231. As shown, one recess 232 corresponds to the first or open position of the connector 100, while a second recess 232 corresponds to a second or closed position of the connector (as shown in FIG. 3B, for example). The TPA latch 130 is adapted to fix the connector

100 in either of the first or second positions by a user. The above-described features may also be formed on the other lateral side of the connector 100, with only a single side shown in the interest of brevity.

The first body 110 further defines a primary terminal latch 140 adapted retain a first terminal 150 with a terminal space or cavity 155 defined in the body 110. A similar second terminal latch 240 is formed on or within the second body 210. Secondary guide features 115 may also be present between the first and second bodies 110,210 (e.g., in the form of the illustrated sliding protrusions and channels) to improve stability and alignment between the connector halves, as well as reduce stress on the hinge 170.

The cross-section of FIG. 2 shows the terminal space 155 in more detail, including the terminal 150 arranged therein. As shown, the first body 110 defines a mechanical stop 156 in the form of a lip positioned at a front end of the terminal space 155 for limiting the insertion depth of the terminal 150 in the illustrated insertion direction I. A groove or notch 151 is formed in the terminal 150 and is adapted to receive a TPA element or protrusion, as described herein.

Still referring to FIGS. 1 and 2, the first body 110 and the second body 210 define respective TPA elements 160,260. The TPA element 260 formed on the second body 210 is adapted to extend through an opening formed in the body 110 and into the groove 151 of the terminal 150, as shown in FIGS. 3A and 3B. Likewise, as can be seen in FIG. 2, the TPA element 160 of the body 110 is adapted to advance through an opening or recess 270 in the second body 210, wherein it will engage a corresponding groove of a second terminal arranged in a second terminal space 255. See also FIGS. 3A and 3B. In some embodiments, the first and second bodies 110,210 include secondary protrusions 162, 262 opposite the TPA elements 160,260. The protrusions 162,262 aid in securing the terminals within their respective terminal spaces or cavities. However, the while the protrusions 162,262 engage with their respective terminals, they do not achieve the same benefits of the TPA elements 160,260.

Referring now to FIGS. 3A and 3B, the connector 100 is shown in the first and second positions, respectively. A second terminal 250 is shown arranged within a terminal space 255 of the second body 210. As shown in FIG. 3A, with both terminals 150,250 sufficiently inserted into respective bodies 110,210, the TPA elements 160,260 are generally aligned with respective openings 270 (with only opening in the second body 210 visible) and the grooves 151,251 of the terminals. In FIG. 3A, however, the position of the terminals 150,250 is not maximized in the insertion direction. Specifically, while the terminals 150,250 are sufficiently inserted to engage the primary terminal latches 140,240 and protrusions 162,262 shown in FIGS. 1 and 2, they are not abutting the corresponding mechanical stops 156,256 in the insertion direction. In distinction, FIG. 3B shows the connector 100 in the second position. As illustrated, the TPA elements 160,260 have engaged with the grooves 151,251 of each terminal 150,250. Due to the hinged nature of the first and second bodies 110,210 and the profile of the grooves 151,251, the TPA elements 160,260 have the ability to impart a degree of axial motion on each terminal 150,250 in the indicated insertion direction I and toward respective stops 156,256. This additional biasing is not imparted by TPA devices of the prior art. With the TPA latch 130 securing the bodies 110,210 in the second position, this optimized position of the terminals 150,250 is maintained, improving terminal stability and overall connector performance.

An exemplary method of operating the connector or plug 100 according to the above-described embodiments is as follows:

1. With the connector 100 in the first position, a user places terminals 150,250 in each terminal cavity 155, 255, and inserts the terminals until the primary terminal latches 140,240 engage corresponding terminal features.
2. The user then compresses or squeezes the rear of the first and second bodies 110,210 toward one another, biasing the TPA latch 130 from the first position toward the second position.
3. As the bodies 110,210 converge, the TPA element(s) 160,260 of one body 110,210 begin to engage with the terminal groove 151,152 on the other opposite body 110,210. The arcing action of the TPA element 160,260 during engagement with the terminal grooves 151,152 acts to bias the terminals 150,250 toward the terminal stops 156,256.
4. As the TPA latch 130 reaches the second position, the protrusion 132 engages with the corresponding recess 232 and holds the connector 100 in the closed or second position, securing the position of the terminals 150,250.

It should be understood that if the terminals 150,250 were not inserted to the point where the primary latches 140,240 engage the terminals appropriately, the TPA elements 160, 260 will stub or bottom on the terminal bodies 110,210 and prevent the TPA latch 130 from closing. This will alert a user that at least one of the terminals 150,250 is not fully inserted into its terminal cavity 155,255. If the TPA latch 130 fails to reach the second position, the connector 100 will create an interference with a corresponding mating connector, and will not be able to be mated. This is will also alert the user that the terminals 150,250 are not fully inserted into the terminal cavities 155,255.

Referring now to FIGS. 5-8, additional embodiments of the present disclosure are shown. Unless otherwise noted, each of the features of the embodiment of FIGS. 1, 2, 3A, 3B and 4 are included, or may be included where applicable, in the exemplary embodiments.

Figure 5:
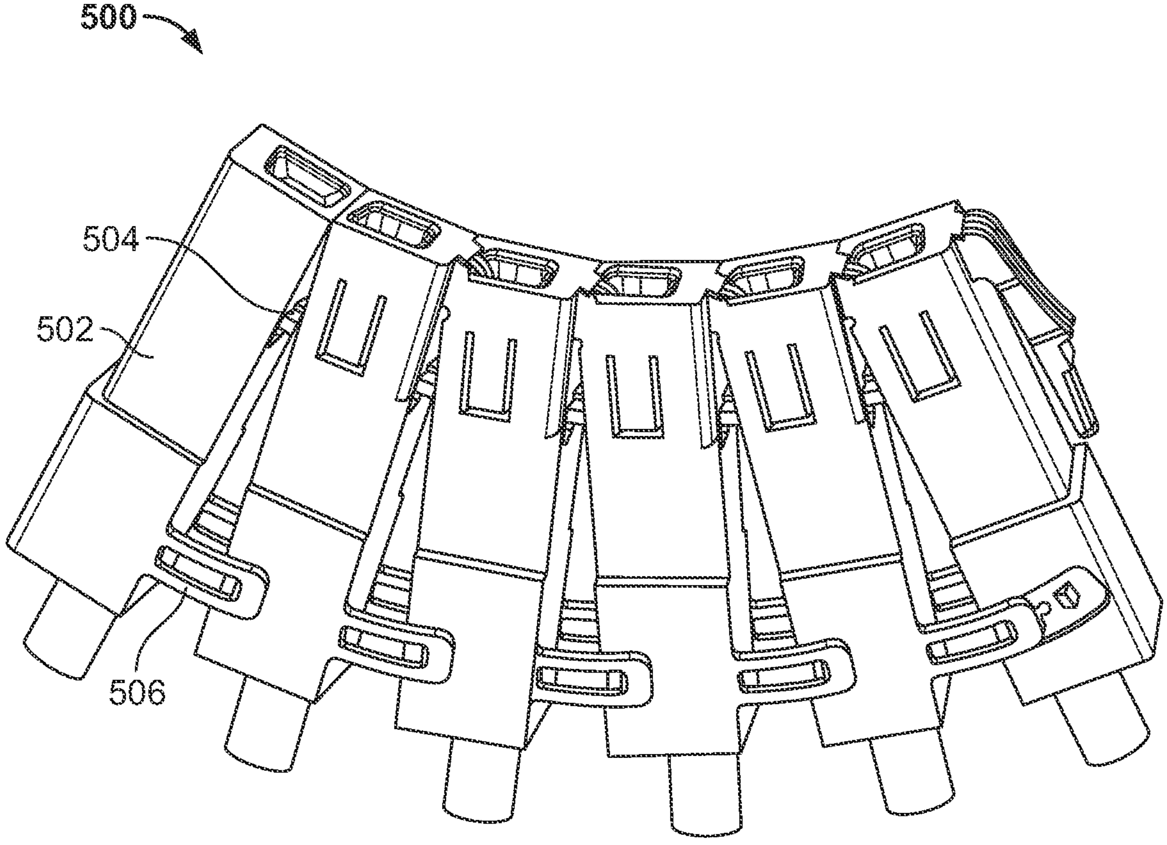
FIG. 5 is a perspective view of a connector according to another embodiment of the present disclosure.

In the embodiment of FIG. 5, an assembly 500 includes a number of plugs 502 may be joined together to form a complete connector. As in the preceding embodiment, each plug 502 receives a TPA device 504 therein from an adjacent plug. The plugs 502 are joined by the illustrated guide arms 506, which also may serve as the above-described TPA latch in order to retain the plugs 502, and more specifically the TPA 504 devices, in the engaged or second position (with the disengaged or first position illustrated. This embodiment retains the advantage of arcuate motion of the TPA elements 504 with respect to terminal positioning and retainment.

Figure 6:
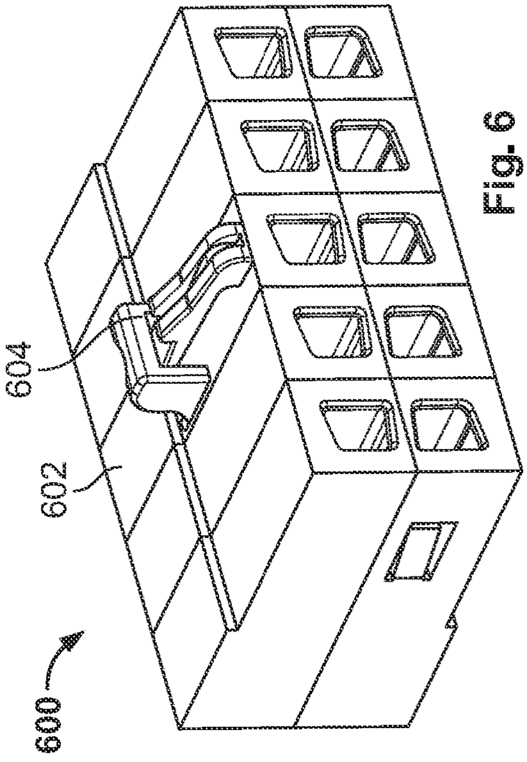
FIG. 6 is a perspective view of a connector according to another embodiment of the present disclosure.

Other multi-plug embodiments include stacked connectors or plugs 602 arranged in rows, as shown in the connector 600 of FIG. 6. This embodiment may retain the same internal features as the embodiment of FIGS. 1-4, as well as features for locking the plugs together in the illustrated second or closed position(s). A single latch 604 may be formed on one of the plugs 602, and serves to secure the entire interconnected plug group to a corresponding catch of a mating connector.

Figure 7:
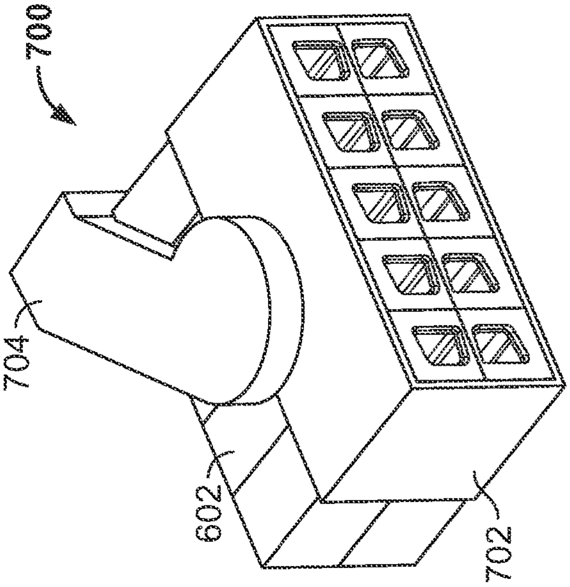
FIG. 7 is a perspective view of a connector according to another embodiment of the present disclosure.

Referring to FIG. 7, an exemplary system 700 and method of increasing TPA engagement force and retention is provided. Specifically, in the case of the ganged plugs 602 of the connector 600 of FIG. 6, the connector 700 of FIG. 7 includes a movable shroud 702. The shroud 702 includes a mechanical assist lever 704 adapted to apply increased closing force between the plugs 602 during TPA engaging actions. In this way, a user may more easily simultaneously engage each of the TPA elements of the plugs 602.

Figure 8:
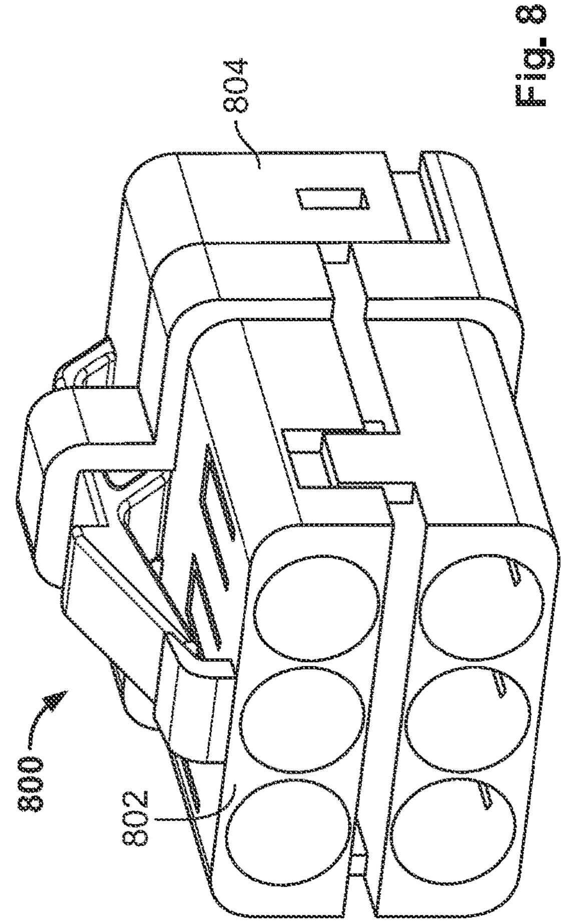
FIG. 8 is a front perspective view of a connector according to another embodiment of the present disclosure.

Finally, in the embodiment of FIG. 8, a connector 800 includes a first body 802 and a second body 804. The bodies 802,804 may be interconnected via a snap-fit along an axial direction. This motion replaces the use of the above-described hinge and its associated arcuate motion. More specifically, the linear motion of the body 804 may be used to bias TPA elements of the connector 800 into a locked or engaged position with terminals arranged in the body 802.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector, comprising:

a first body defining a terminal space sized to receive a terminal;

a second body rotatably connected to the first body, the second body rotatable between a first position and a second position with respect to the first body;

a terminal position assurance (TPA) element defined on the second body, the TPA element arranged outside of the terminal space of the first body in the first position of the second body and arranged within the terminal space of the first body in the second position of the second body for engaging with the terminal; and a TPA latch defined by at least one of the first and second bodies and selectively securing the first and second bodies in the second position.

2. The connector of claim 1, wherein the TPA latch includes a first locking feature fixing the first and second bodies in the first position and a second locking feature fixing the first and second bodies in the second position.

3. The connector of claim 1, wherein the first and second bodies are rotatably connected about an axis generally perpendicular to an insertion direction of the terminal into the terminal space.

4. The connector of claim 1, further comprising a terminal stop formed within the terminal space for limiting an insertion depth of a terminal in an inserted position, the TPA element adapted to urge the terminal in a direction of the terminal stop as the second body is moved into the second position relative to the first body.

5. The connector of claim 2, wherein the first and second bodies are hingedly connected on a front end of the connector proximate the terminal stop, and opposite a rear terminal insertion end of the connector.

6. The connector of claim 1, wherein the TPA element comprises a TPA protrusion extending from the second body toward the first body.

7. The connector of claim 6, wherein the TPA protrusion translates along an arcuate path as the first and second bodies move between the first position and the second position.

8. The connector of claim 6, further comprising a terminal arranged within the terminal space, wherein in the second position, the TPA protrusion engages with a groove formed in the terminal, wherein misalignment of the TPA protrusion and the terminal groove prevents the first and second bodies from being placed in the second position.

9. The connector of claim 8, wherein the first body defines an opening sized to receive the TPA protrusion as the first and second bodies move into the second position.

10. The connector of claim 1, wherein the second body includes a second terminal space for receiving a second terminal.

11. The connector of claim 10, wherein the first body includes a TPA element arranged within the second terminal space of the second body in the second position and securing the second terminal within the second terminal space.

12. A connector, comprising:

a first body defining:
- a first terminal space for receiving a first terminal; and
- a first terminal position assurance (TPA) element;

a second body rotatably connected to the first body and movable between a first position and a second position, the second body defining:
- a second terminal space for receiving a second terminal; and
- a second TPA element, wherein in the first position the first TPA element is arranged outside of the second terminal space and the second TPA element is arranged outside of the first terminal space, and in the second position the first TPA element is arranged within the second terminal space for engaging with the second terminal, and the second TPA element is arranged within the first terminal space for engaging with the first terminal; and a terminal latch formed on each of the first and second bodies for securing the first and second terminals in respective ones of the first and second terminal spaces, the terminal latches functioning independently of the first and second TPA elements.

13. The connector of claim 12, further comprising a latch for selectively securing the first and second bodies in each of the first and second positions.

14. The connector of claim 12, wherein each of the first and second bodies includes an opening for receiving a respective one of the first and second TPA elements therethrough in the second position, the openings formed through opposing surfaces of the first and second bodies in the second position.

15. The connector of claim 12, further comprising a third body rotatably connected to the second body and movable between a first position and a second position, the third body defining:
- a third terminal space for receiving a third terminal; and
- a third TPA element.

16. A connector, comprising:

a first body defining:
- a first terminal space for receiving a first terminal; and
- a first terminal position assurance (TPA) element;

a second body rotatably connected to the first body and movable between a first position and a second position, the second body defining:

a second terminal space for receiving a second terminal; and a second TPA element, wherein in the first position the first TPA element is arranged outside of the second terminal space and the second TPA element is arranged outside of the first terminal space, and in the second position the first TPA element is arranged within the second terminal space for engaging with the second terminal, and the second TPA element is arranged within the first terminal space for engaging with the first terminal; and a latch adapted to selectively secure the first and second bodies in each of the first and second positions.

17. The connector of claim 16, wherein each of the first and second bodies includes an opening for receiving a respective one of the first and second TPA elements therethrough in the second position, the openings formed through opposing surfaces of the first and second bodies in the second position.

18. The connector of claim 16, further comprising a terminal latch formed on each of the first and second bodies for securing the first and second terminals in respective ones of the first and second terminal spaces, the terminal latches functioning independently of the first and second TPA elements.

* * * * *